United States Patent
Huang et al.

(10) Patent No.: US 10,156,225 B2
(45) Date of Patent: Dec. 18, 2018

(54) METHOD FOR BLACK STARTING WIND TURBINE, WIND FARM, AND RESTORING WIND FARM AND WIND TURBINE, WIND FARM USING THE SAME

(71) Applicant: ABB Schweiz AG, Baden (CH)

(72) Inventors: Xing Huang, Beijing (CN); Yao Chen, Beijing (CN)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 15/360,108

(22) Filed: Nov. 23, 2016

(65) Prior Publication Data
US 2017/0074244 A1    Mar. 16, 2017

Related U.S. Application Data

(63) Continuation of application No. PCT/CN2014/092019, filed on Nov. 24, 2014.

(51) Int. Cl.
F03D 9/25    (2016.01)
F03D 9/11    (2016.01)
(Continued)

(52) U.S. Cl.
CPC ............ *F03D 9/257* (2017.02); *F03D 7/026* (2013.01); *F03D 7/048* (2013.01); *F03D 9/11* (2016.05);
(Continued)

(58) Field of Classification Search
None
See application file for complete search history.

(56) References Cited

U.S. PATENT DOCUMENTS

| 9,217,418 B2 * | 12/2015 | Bodewes | F03D 9/257 |
| 2008/0001408 A1 * | 1/2008 | Liu | F03D 7/00 |
| | | | 290/44 |

(Continued)

FOREIGN PATENT DOCUMENTS

| CN | 101309002 A | 11/2008 |
| CN | 101629553 A | 1/2010 |

(Continued)

OTHER PUBLICATIONS

State Intellectual Property Office of the P.R. China, International Search Report & Written Opinion issued in corresponding Application No. PCT/CN2014/092019, dated Aug. 10, 2015, 9 pp.

(Continued)

*Primary Examiner* — Jason Lin
(74) *Attorney, Agent, or Firm* — Taft Stettinius & Hollister LLP (57) ABSTRACT

A method for black starting a wind turbine and a wind farm following islanding operation, a method for restoring the wind farm following the islanding operation, and the wind turbine and wind farm. The wind turbine comprises auxiliary equipment, a generator, a converter electrically connectable to the generator, and an energy storage system, the generator is electrically connectable to the auxiliary equipment via the converter, the energy storage system is electrically connectable to the auxiliary equipment. The method for black staring the wind turbine including: measuring wind blowing smoothness degree; selecting a first power source to supply first power to the auxiliary equipment in V/f control mode and selecting a second power source to adjust an amount of active power and reactive power fed to the auxiliary equipment by the first power source in consideration of the amount of active power and reactive power demand suitable (Continued)

for powering the auxiliary equipment; and connecting the power sources to the auxiliary equipment.

16 Claims, 4 Drawing Sheets

(51) Int. Cl.
    *H02J 3/38* (2006.01)
    *F03D 7/02* (2006.01)
    *F03D 17/00* (2016.01)
    *F03D 7/04* (2006.01)
    *G05B 15/02* (2006.01)
    *H02J 11/00* (2006.01)

(52) U.S. Cl.
    CPC ............ *F03D 17/00* (2016.05); *G05B 15/02* (2013.01); *H02J 3/386* (2013.01); *F05B 2220/706* (2013.01); *F05B 2270/107* (2013.01); *F05B 2270/30* (2013.01); *F05B 2270/32* (2013.01); *H02J 11/00* (2013.01); *Y02E 10/723* (2013.01); *Y02E 10/725* (2013.01); *Y02E 10/763* (2013.01)

(56) References Cited

U.S. PATENT DOCUMENTS

| | | | |
|---|---|---|---|
| 2008/0284172 A1 | 11/2008 | Nielsen | |
| 2009/0206603 A1* | 8/2009 | Llorente Gonzalez | F03D 7/0224 290/44 |
| 2009/0278354 A1* | 11/2009 | Ichinose | H02P 9/007 290/44 |
| 2011/0187106 A1* | 8/2011 | Ichinose | F03D 7/048 290/44 |
| 2014/0354234 A1* | 12/2014 | Sudan | H02J 7/0055 320/127 |
| 2015/0014992 A1* | 1/2015 | Andresen | F03D 7/0284 290/44 |
| 2015/0256030 A1 | 9/2015 | Schult et al. | |

FOREIGN PATENT DOCUMENTS

| | | |
|---|---|---|
| CN | 102439299 A | 5/2012 |
| CN | 103259475 A | 8/2013 |
| CN | 103460545 A | 12/2013 |
| CN | 103890385 A | 6/2014 |
| CN | 104143832 A | 11/2014 |
| EP | 1909371 A2 | 4/2008 |
| EP | 1993184 A1 | 11/2008 |
| EP | 2146095 A2 | 1/2010 |
| EP | 2236821 A1 | 10/2010 |
| EP | 2503146 B1 | 12/2013 |
| EP | 1752659 B1 | 3/2014 |
| WO | 2013135504 A1 | 9/2013 |
| WO | 2014082757 A1 | 6/2014 |

OTHER PUBLICATIONS

Extended European Search Report, European Patent Application No. 14906734.0, dated Jun. 25, 2018, 7 pages.

Dong Li et al, Analysis of Nordex N43/600 Wind Turbine, Power Electronics Systems and Applications, 2009, 7 pages.

First Chinese Office Action, Chinese Patent Application Serial No. 201480080253.2, dated Jul. 17, 2018, 6 pages including machine translation in English.

Chinese Search Report, Chinese Patent Application Serial No. 201480080253.2, dated Jul. 17, 2018, 4 pages including machine translation in English.

* cited by examiner

METHOD FOR BLACK STARTING WIND TURBINE, WIND FARM, AND RESTORING WIND FARM AND WIND TURBINE, WIND FARM USING THE SAME

TECHNICAL FIELD

The invention relates to a method for black starting a wind turbine and a wind farm following islanding operation and restoring the wind farm and a wind turbine and a wind farm using the same, and more particularly to regulating a multiple of power sources in the wind turbine for powering its auxiliary equipment during the period of black start operation.

BACKGROUND ART

It is well-known that in offshore wind farms, an independent emergency source of electrical power is to be provided for the power supply of emergency consumers (which can also be referred as auxiliary loads), e.g. lighting and signalling systems, etc., when the main power supply fails; and the supply time period should meet the requirement from e.g. several hours to several days for different loads. There are two feasible solutions to meet these requirements: using diesel generator sets as the emergency source, or using ESS as the emergency source.

Patent EP 2236821A1 discloses a method and a system for islanding operation of at least two wind turbines associated with a wind farm, wherein said wind farm is configured for providing power generated by wind turbines in said wind farm to a main grid and wherein the method comprises: detecting at least two or more deactivated wind turbines in said wind farm, said deactivated wind turbines being kept in stand-by operation by using its uninterrupted power supply (a sort of energy storage system) and being disconnected from said main grid; configuring at least one islanded local grid for electrically connecting said two or more deactivated wind turbines; activating at least one of said deactivated wind turbine using a black start operation; and, connecting said at least one activated wind turbine and at least one of said deactivated wind turbines to said local grid, said activated wind turbine acting as a power supply for said at least one deactivated wind turbine connected to said local grid.

Patent WO 2014082757 A1 discusses a method involving connecting a converter unit to an electrical network on network side. The electrical energy generated by a generator is fed into the electrical network via converter unit. The electrical energy is drawn from an energy storage unit by an auxiliary energy unit for an adjustable period of time if converter unit and auxiliary energy unit are disconnected from electrical network. The electrical energy generated by generator is then drawn by the auxiliary energy unit via the converter unit.

However, each one of these references suffers from one or more of the following disadvantages: 1. it may lose voltage and frequency stability during the transients without appropriate coordination between operations of the generator and the energy storage system of the wind turbine; 2. it may lose voltage and frequency stability during the transients without appropriate coordination between operations of one wind turbine and another.

BRIEF SUMMARY OF THE INVENTION

It is therefore an objective of the invention to provide a method for black starting a wind turbine following islanding operation, wherein the wind turbine comprises auxiliary equipment, a generator, a converter electrically connectable to the generator, and an energy storage system, the generator is electrically connectable to the auxiliary equipment via the converter, the energy storage system is electrically connectable to the auxiliary equipment, the method including: measuring wind blowing smoothness degree; if the measured wind blowing smoothness degree is above a smoothness threshold, selecting the generator as a first power source to supply first power to the auxiliary equipment in V/f control mode and selecting the energy storage system as a second power source to adjust an amount of active power and reactive power fed to the auxiliary equipment by the first power source in consideration of amount of active power and reactive power demand suitable for powering the auxiliary equipment; otherwise selecting the energy storage system as a first power source to supply power to the auxiliary equipment in V/f control mode and selecting the generator as a second power source to adjust an amount of active power and reactive power fed to the auxiliary equipment by the first power source in consideration of the amount of active power and reactive power demand suitable for powering the auxiliary equipment; electrically connecting both of the selected first power source and the selected second power source to a power input terminal of the auxiliary equipment to supply the first power and the second power.

According another aspect of present invention, it provides a wind turbine, including: a generator; a converter electrically connectable to the generator; an energy storage system; a first measurement device for measuring wind blowing smoothness; a wind turbine controller; a first switch, being arranged between a power output of the converter and a power input of the auxiliary equipment; a second switch, being arranged between a power output of the energy storage system and the power input of the auxiliary equipment; following islanding operation of the wind turbine, the wind turbine controller is adapted for: if the measured wind blowing smoothness degree is above a smoothness threshold, selecting the generator as a first power source to supply first power to the auxiliary equipment in V/f control mode and selecting the energy storage system as a second power source to adjust an amount of active power and reactive power fed to the auxiliary equipment by the first power source in consideration of amount of active power and reactive power demand suitable for powering the auxiliary equipment; otherwise selecting the energy storage system as a first power source to supply power to the auxiliary equipment in V/f control mode and selecting the generator as a second power source to adjust an amount of active power and reactive power fed to the auxiliary equipment by the first power source in consideration of the amount of active power and reactive power demand suitable for powering the auxiliary equipment; and controlling to close the first switch and the second switch to supply the first power and the second power to the auxiliary equipment.

By coordinating the power supply by the selected first power source and the selected second power source of the wind turbine to the auxiliary equipment of the same wind turbine, the wind turbine can perform black start operation on its own following the islanding operation while does not rely on the power delivered from a generator of other wind turbine; this is helpful for reduction of communication between wind turbines. In addition, voltage and frequency stability concerning the V/f control of the selected first power source during the transients is increased due to active power and reactive power contributed by the selected second power source.

BRIEF DESCRIPTION OF THE DRAWINGS

The subject matter of the invention will be explained in more detail in the following text with reference to preferred exemplary embodiments which are illustrated in the drawings, in which.

The reference symbols used in the drawings, and their meanings, are listed in summary form in the list of reference symbols. In principle, identical parts are provided with the same reference symbols in the figures.

PREFERRED EMBODIMENTS OF THE INVENTION

Figure 1:
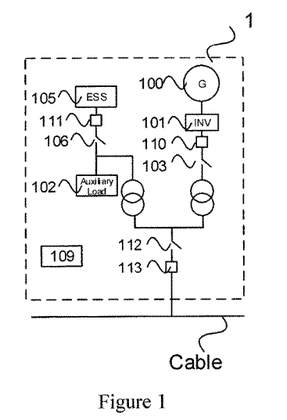
FIG. 1 illustrates a schematic of the main components of a wind turbine according to an embodiment of present invention.

FIG. 1 illustrates a schematic of the main components of a wind turbine according to an embodiment of present invention. As shown in FIG. 1, the wind turbine 1 comprises a generator 100, e.g. a permanent magnet generator or a synchronous or asynchronous type generator, which transforms the rotary energy of the blades in a variable frequency ac electrical power. The power output of the generator is electrically connectable to a converter 101 to feed its output into the converter 101 typically for converting the ac power into an AC power of a frequency used by the main grid. The converter 101, for example, can be an electrical power conversion apparatus comprising an AC/DC conversion for converting the AC power to a DC power and a DC/AC conversion for converting the DC power into an AC power of a frequency used by the main grid, namely a back to back converter. The power output of the converter 101 is electrically connectable to a power input of auxiliary equipment 102 via a first switch 103 and a transformer unit 104. The auxiliary equipment can be navigation lights used to signal the position of wind turbine, sensors used to get the operation parameters of wind turbine, communication apparatus used to send/receive the feedback/order with the substation, ventilation and heating equipment used to provide the required temperature for the equipment installed in wind turbine, for etc. The first switch 103 can be a circuit breaker whose on/off status can be switched according to instruction by a wind turbine controller 109. A power output of an energy storage system 105 is electrically connectable to the power input of the auxiliary equipment 102 via a second switch 106, e.g. a circuit breaker whose on/off status can be switched according instruction by the wind turbine controller 109. A first measurement device 107 can measure wind blowing smoothness, and the wind turbine converter can be started for power generation when the wind speed has reached the following range:

$$\omega_{min} \leq \omega(t) \leq \omega_{max}, t \in [t, t+\Delta t]$$

Where $\omega_{min}$ and $\omega_{max}$ are the cut-in and cut-out wind speed of wind turbine, here we take a full power large scale offshore wind turbine as an example, then $\omega_{min}$=3 m/s and $\omega_{max}$=20 m/s, $\omega(t)$ is the wind speed during $\Delta t$ time period, and $\Delta t$ is decided according to the minimum time requirement for the auxiliary power supply of several important auxiliary load, here we define $\Delta t$=15 seconds. The wind turbine controller 109 may collect operational data (e.g. power level, temperature, wind speed, conversion efficiency, etc.) and use these operational data to control the wind turbine such that optimal operation of the wind turbine is achieved. Further, the wind turbine controller 109 comprises a transmitter/receiver unit for providing for a data link 108 with the first measurement device 107, for providing instruction to the first switch 103 and the second switch 106 to change their switching statuses.

Islanding is a situation which may occur if a wind farm or part of the wind turbines of the wind farm becomes disconnected from the electrical grid, e.g. because of planned switching action or protective switching of a circuit breaker in the grid. For example after detection of a power failure circuit breakers may automatically disconnect one or more wind turbines from the grid. Thereafter, each disconnected wind turbine sets itself to a parking or standby state by stopping rotation of the blades by pitching the blades in the vane position. The standby state will last until the islanded wind farm can be reconnected to the grid. Following the islanding stage, the wind turbine is to be connected to the electrical grid; therefore, the wind turbine needs to operate in a black start mode in which its auxiliary equipment is supplied with power from a power source in the wind turbine. According to an embodiment of present invention as shown in FIG. 1, under the control of the wind turbine controller 109, the generator 100 and the energy storage system are selected as the power source for power the auxiliary equipment 102 of the wind turbine 1 operating in the black start mode. Where acting as the power source, the generator/energy storage system can either operate in voltage/frequency (V/f) control mode or in active/reactive power (P/Q) control mode. P/Q control mode can provide active/reactive power for the auxiliary load as a current source, which means P/Q control mode can support power for the system, but cannot provide stable voltage and frequency for the auxiliary load in islanding operation. Thus at least one generator/energy storage systems should work in V/f control mode, which can generate power for the auxiliary load as a voltage source, and provide voltage and frequency support for the system. The wind turbine 1 comes into operation of black start mode following its islanding operation, the wind turbine controller 109 is adapted for: if the measured wind blowing smoothness degree is above a smoothness threshold, selecting the generator 100 as a first power source to supply first power to the auxiliary equipment 102 in V/f control mode and selecting the energy storage system 105 as a second power source to adjust an amount of active power and reactive power fed to the auxiliary equipment 102 by the first power source in consideration of amount of active power and reactive power demand suitable for powering the auxiliary equipment 102; otherwise selecting the energy storage system 105 as a first power source to supply power to the auxiliary equipment 102 in V/f control mode and selecting the generator 100 as a second power source to adjust an amount of active power and reactive power fed to the auxiliary equipment 102 by the first power source in consideration of the amount of active power and reactive power demand suitable for powering the auxiliary equipment 102. Upon the selection, the wind turbine controller 109 can control to close the first switch and the second switch to supply the first power and the second power to the auxiliary equipment. Preferably, the selected second power source supplies the second power in P/Q control mode. If the generator 100 is selected as the first power source: if the energy storage system 105 capacity is enough for the auxiliary power supply with minimum power supply time period, the selected second power source supplies the second power in V/f control mode, otherwise the selected second power source supplies the second power in P/Q control model. Preferably, the wind turbine 1 further comprises: a second measurement device 110 for measuring reactive and active power and voltage and frequency at output of the first power source; and a third measurement device 111 for measuring reactive power and active power and frequency and voltage at output of the second power; wherein: for the selected first power source in V/f control mode, the wind turbine controller is further adapted for calculating its voltage and frequency reference according to measurements of reactive and active power at output of the first power source; and for the selected second power source in P/Q control mode, the wind turbine controller is further adapted for calculating its active and reactive power reference according to measurements of the frequency and voltage at output of the second power.

Figure 2A:
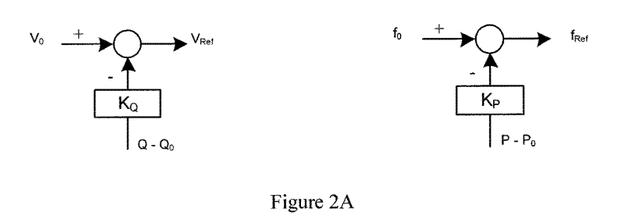
FIGS. 2A and 2B show voltage and frequency reference calculation under V/f control mode according to an embodiment of present invention.
Figure 2B:
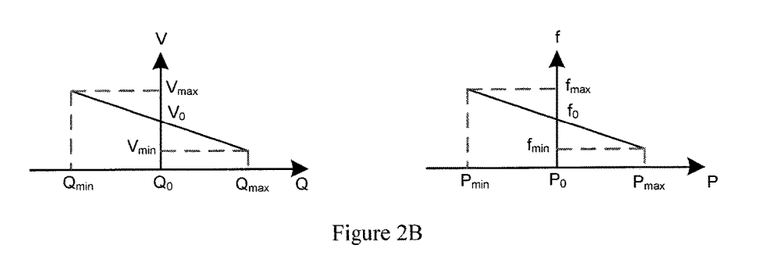

For example, if the first/second power source is selected to work in V/f control mode, as illustrated in FIG. 2A, the voltage and frequency references for this power source will be calculated according to a pre-defined operating point ($V_0$, $Q_0$) and ($f_e$, $P_0$), the measured reactive and active power output Q and P, and the droop factors $K_Q$ and $K_P$. By doing this, we can protect this power source from running out of capacity. The V/Q and f/P characteristics can be further illustrated in FIG. 2B.

Figure 2C:
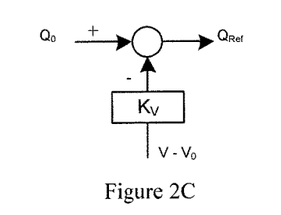
FIGS. 2C and 2D show active and reactive power reference calculation under P/Q control mode according to another embodiment of present invention.
Figure 2D:
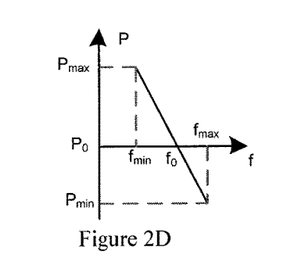

On the other hand, if the first/second power source is selected to work in P/Q control mode, as illustrated in FIG. 2C, the active and reactive power reference references will be calculated according to a pre-defined operating point ($P_0$, $f_0$) and ($Q_0$, $V_0$), the measured frequency and voltage f and V, and the droop factors $K_f$ and $K_V$. By doing this, we can ensure the stable operation of the system with multiple power sources operated together in an autonomous way. The P/f and Q/V characteristics can be further illustrated in FIG. 2D. By coordinating the power supply by the selected first power source and the selected second power source of the wind turbine to the auxiliary equipment of the same wind turbine, the wind turbine can perform black start operation on its own following the islanding operation while does not rely on the power delivered from a generator of other wind turbine; this is helpful for reduction of communication between wind turbines. In addition, voltage and frequency stability concerning the V/f control of the selected first power source during the transients is increased due to active power and reactive power contributed by the selected second power source. This is because, the big exchange of auxiliary load during the transients will lead to the exchange of system voltage amplitude and frequency, and then the power source with P/Q control will modify their output power according to this exchange of system voltage amplitude and frequency immediately, which can help to realize the system power balance, and furthermore, increase the system voltage and frequency stability.

Figure 3:
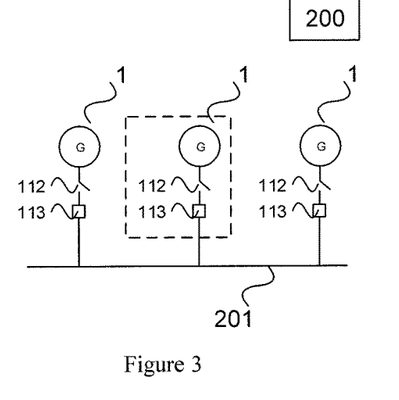
FIG. 3 illustrates a wind farm according to an embodiment of present invention.

FIG. 3 illustrates a wind farm according to an embodiment of present invention. As shown in FIG. 3, the wind farm 2 includes a wind farm controller 200, a cable 201, a multiple of wind turbines 1 according to FIG. 1. Each of the wind turbines 1 further includes a third switch 112 arranged between the power output of its converter 101 and the cable 201 and a fourth measurement device 113 for measuring the voltage and frequency on its connection to the cable 201. For example, the fourth measurement device 113 can be voltage and current sensors which can detect the voltage and current values at the wind turbine output point. Furthermore, based on these voltage and current values, calculate the voltage amplitude, system frequency, and wind turbine output active and reactive power, etc. Following the islanding stage, the wind farm 2 is to be connected to the electrical grid; therefore, each of the multiple of wind turbines 1 needs to operate in a black start mode in which its auxiliary equipment is supplied with power from a power source in the wind turbine. In the black start stage following islanding mode of the wind farm, the wind farm controller 200 is adapted for: choosing one wind turbine among the plurality of wind turbines 1. For example, the wind turbine 1 in the broken circle is chosen. The wind farm controller 200 further instructs the wind turbine controller 109 of the chosen wind turbine 1 (in the broken circle) to control to close the third switch 112 of the chosen wind turbine 1, and instructs the wind turbine controller 109 of the other wind turbine (not in the broken circle) to regulate the voltage and frequency of its first power source to approach measurements of the voltage and frequency on the cable by its fourth measurement device 113 so as to get the unchosen wind turbine to be synchronized with the chosen wind turbine. The wind turbine controller 109 of the other wind turbine (not in the broken circle) is further adapted for controlling to close its third switch 112 following the regulation by the wind turbine controller 109 of the chosen wind turbine 1 (in the broken circle) upon synchronization of the chosen wind turbine and the unchosen wind turbine. For example, Based on the measured voltage and frequency on the cable, the wind turbine controller 109 of the unchosen wind turbine, which is synchronizing with the chosen wind turbine, can get the voltage difference between its own wind turbine and the cable. In order to limit the rush current when closing the third switch 112 of this synchronizing wind turbine, this voltage difference should follow three criteria before closing its third switch 112:

Frequency difference: $\omega_S = \omega_{WT} - \omega_{Cable} \approx 0$

Voltage vector amplitude difference: $V_S = V_{WT} - V_{Cable} \approx 0$

Phase angle difference: $\angle \varnothing_S = \angle \theta_{WT} - \angle \theta_{Cable} \approx 0°$ By having the other wind turbines synchronize with the chosen wind turbine blacking start on its own, the inrush current evolved between the chosen and the unchosen during synchronization can be suppressed.

Figure 4:
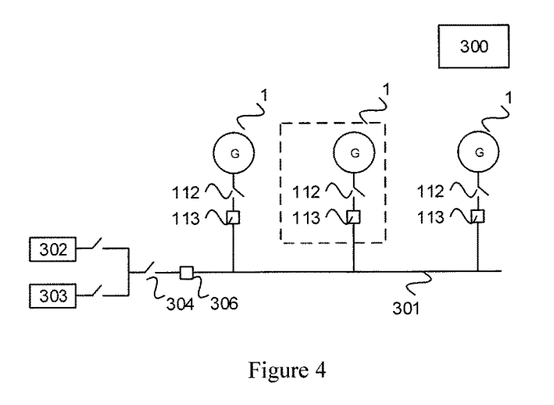
FIG. 4 illustrates a wind farm according to another embodiment of present invention.
Figure 5:
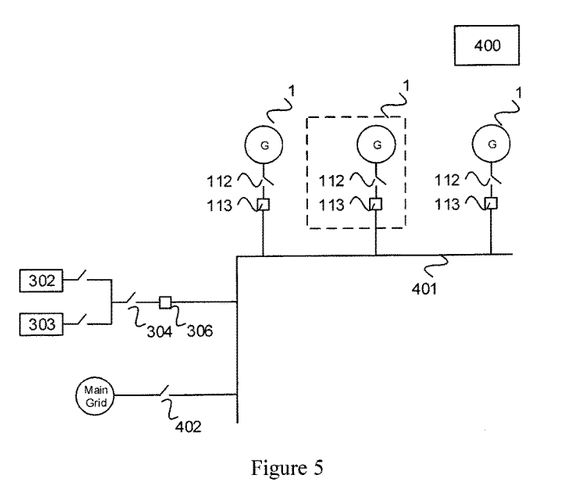
FIG. 5 illustrates a wind farm according to another embodiment of present invention.

FIG. 4 illustrates a wind farm according to an embodiment of present invention. As shown in FIG. 4, the wind farm 3 includes a wind farm controller 300, a cable 301, a multiple of wind turbines 1 according to FIG. 1, a substation level energy storage system 302, a substation level auxiliary equipment 303, a fourth switch 304 being arranged between the substation level energy storage system 302 and the cable 301, a fifth switch 305 being arranged between the substation level auxiliary equipment 303 and the cable 301, and fifth measurement device 306 for measuring the voltage and frequency on its connection to the cable 301. Each of the plurality of wind turbines 1 further includes a third switch 112 arranged between the power output of its converter 101 and the cable 301. Following the islanding stage, the wind farm 3 is to be connected to the electrical grid; therefore, each of the multiple of wind turbines 1 needs to operate in a black start mode in which its auxiliary equipment is supplied with power from a power source in the wind turbine. In the black start stage following islanding mode of the wind farm, the wind farm controller 300 is adapted for choosing one wind turbine among the plurality of wind turbines 1. For example, the wind turbine 1 in the broken circle is chosen. The wind farm controller 300 further instructs the wind turbine controller 109 of the chosen wind turbine 1 (in the broken circle) to close the third switch 112 of the chosen wind turbine 1, and instructs to regulate voltage and frequency of the substation level energy storage system 302 operating in V/f control mode to approach the measurements of the voltage and frequency on its connection to the cable 301 so as to get the substation level energy storage system 302 to be synchronized with the chosen wind turbine 1. The wind farm controller 300 then can control to close the fourth switch 304 and the fifth switch 305 upon the synchronization of the substation level energy storage system 302 and the chosen wind turbine 1. For example, based on the measured voltage and frequency on the cable 301, the energy storage system controller can get the voltage difference between its own energy storage system 302 and cable 301. In order to limit the rush current when closing the third switch 112 of energy storage system 302, this voltage difference should follow three criteria before closing this third switch 112:

Frequency difference: $\omega_{ES} - \omega_{ESS} - \omega_{Cable} \approx 0$
Voltage vector amplitude difference: $V_{ES} = V_{ESS} - V_{Cable} \approx 0$
Phase angle difference: $\angle \varnothing_{ES} = \angle \theta_{ESS} - \angle \theta_{Cable} \approx 0°$ By having the substation level energy storage system with the chosen wind turbine blacking start on its own, the inrush current evolved between them can be suppressed. FIG. 5 illustrates a wind farm according to an embodiment of present invention. As shown in FIG. 5, the wind farm 4 includes a wind farm controller 400, a cable 401, a sixth switch 402 being arranged between the cable 401 and main grid, a multiple of wind turbines 1 according to FIG. 1. Each of the plurality of wind turbines 1 further includes a third switch 112 arranged between the power output of its converter 101 and the cable 401 and a fourth measurement device 113 for measuring the voltage and frequency on its connection to the cable 401. During restoration mode of the wind farm following its islanding mode, the wind farm controller 400 is adapted for: choosing at least one wind turbine among the plurality of wind turbines; controlling to close the sixth switch; instructing the wind turbine controller of the chosen wind turbine to regulate the voltage and frequency of its first power source to approach measurements of the voltage and frequency on the cable by its fourth measurement device; and controlling to close the third switch of the chosen wind turbine following the regulation by the wind turbine controller of the chosen wind turbine.

Though the present invention has been described on the basis of some preferred embodiments, those skilled in the art should appreciate that those embodiments should by no way limit the scope of the present invention. Without departing from the spirit and concept of the present invention, any variations and modifications to the embodiments should be within the apprehension of those with ordinary knowledge and skills in the art, and therefore fall in the scope of the present invention which is defined by the accompanied claims.

The invention claimed is:

1. A method for black starting a wind turbine following islanding operation, wherein the wind turbine comprises auxiliary equipment, a generator, a converter electrically connectable to the generator, and an energy storage system, the generator is electrically connectable to the auxiliary equipment via the converter, the energy storage system is electrically connectable to the auxiliary equipment, the method including:
   measuring wind blowing smoothness degree;
   determining whether the measured wind blowing smoothness degree is above a smoothness threshold;
   in response to determining the measured wind blowing smoothness degree is above the smoothness threshold, selecting the generator as a first power source to supply first power to the auxiliary equipment in V/f control mode and selecting the energy storage system as a second power source to adjust an amount of active power and reactive power fed to the auxiliary equipment by the first power source in consideration of amount of active power and reactive power demand suitable for powering the auxiliary equipment;
   in response to determining the measured wind blowing smoothness degree is not above the smoothness threshold, selecting the energy storage system as a first power source to supply power to the auxiliary equipment in V/f control mode and selecting the generator as a second power source to adjust an amount of active power and reactive power fed to the auxiliary equipment by the first power source in consideration of the amount of active power and reactive power demand suitable for powering the auxiliary equipment; electrically connecting both of the selected first power source and the selected second power source to a power input terminal of the auxiliary equipment to supply the first power and the second power.

2. The method according to claim 1, further including:
   the selected second power source supplies the second power in P/Q control mode.

3. The method according to claim 2, wherein:
   if the generator is selected as the first power source,
   the method further includes:
      if the energy storage system capacity is enough, the selected second power source supplies the second power in V/f control mode;
      otherwise the selected second power source supplies the second power in P/Q control mode.

4. The method according to claim 1, wherein:
   if the generator is selected as the first power source,
   the method further includes:
      if the energy storage system capacity is enough, the selected second power source supplies the second power in V/f control mode;
      otherwise the selected second power source supplies the second power in P/Q control mode.

5. The method according to claim 1, wherein:
   for the selected first power source in V/f control mode, its voltage and frequency reference is calculated according to measurements of reactive and active power at output of the first power source; and
   for the selected second power source in P/Q control mode, its active and reactive power reference is calculated according to measurements of the frequency and voltage at output of the second power.

6. A method for black starting a wind farm during islanding mode, where wind farm includes a multiple of wind turbines electrically connectable to each other via a cable, including:
   choosing one wind turbine among the plurality of wind turbines;

black starting the chosen wind turbine according to the method according to claim 1;
electrically connecting the chosen wind turbine to the cable;
regulating voltage and frequency of the first power source of the other wind turbine among the plurality of wind turbines to approach measurements of the voltage and frequency on the cable; and
electrically connecting the other wind turbine to the cable.

7. A method for black starting a wind farm during islanding mode, where the wind farm includes a multiple of wind turbines electrically, a substation level energy storage system and a substation level auxiliary equipment connectable to each other via a cable, including:
choosing one wind turbine among the plurality of wind turbines;
black starting the chosen wind turbine according to the method according to claim 1;
electrically connecting the chosen wind turbine to the cable;
regulating voltage and frequency of the substation level energy storage system operation in V/f control mode to approach the measurements of the voltage and frequency on the cable; and
electrically connecting the substation level energy storage system and the substation level auxiliary equipment to the cable.

8. A method for restoring a wind farm following islanding mode, wherein the wind farm includes a multiple of wind turbines electrically connectable to each other via a cable, including:
choosing at least one wind turbine among the plurality of wind turbines;
black starting the chosen wind turbine according to the method according to claim 1;
electrically connecting main grid to the cable;
regulating voltage and frequency of the first power source of the chosen wind turbine among the plurality of wind turbines to approach measurements of the voltage and frequency on the cable; and
electrically connecting the chosen wind turbine to the cable.

9. A wind turbine, including:
a generator;
a converter electrically connectable to the generator;
an energy storage system;
a first measurement device for measuring wind blowing smoothness;
a wind turbine controller;
a first switch, being arranged between a power output of the converter and a power input of the auxiliary equipment;
a second switch, being arranged between a power output of the energy storage system and the power input of the auxiliary equipment;
following islanding operation of the wind turbine, the wind turbine controller is adapted for:
if the measured wind blowing smoothness degree is above a smoothness threshold, selecting the generator as a first power source to supply first power to the auxiliary equipment in V/f control mode and selecting the energy storage system as a second power source to adjust an amount of active power and reactive power fed to the auxiliary equipment by the first power source in consideration of amount of active power and reactive power demand suitable for powering the auxiliary equipment;
otherwise selecting the energy storage system as a first power source to supply power to the auxiliary equipment in V/f control mode and selecting the generator as a second power source to adjust an amount of active power and reactive power fed to the auxiliary equipment by the first power source in consideration of the amount of active power and reactive power demand suitable for powering the auxiliary equipment; and
controlling to close the first switch and the second switch to supply the first power and the second power to the auxiliary equipment.

10. The wind turbine according to claim 9, wherein:
the selected second power source supplies the second power in P/Q control mode.

11. The wind turbine according to claim 10, wherein:
if the generator is selected as the first power source,
if the energy storage system capacity is enough, the selected second power source supplies the second power in V/f control mode;
otherwise the selected second power source supplies the second power in P/Q control model.

12. The wind turbine according to claim 9, wherein:
if the generator is selected as the first power source,
if the energy storage system capacity is enough, the selected second power source supplies the second power in V/f control mode;
otherwise the selected second power source supplies the second power in P/Q control model.

13. The wind turbine according to claim 9, further including:
a second measurement device, for measuring reactive active power and voltage and frequency at output of the first power source; and
a third measurement device, for measuring reactive and active and frequency and voltage at output of the second power;
wherein:
for the selected first power source in V/f control mode, the wind turbine controller is further adapted for calculating its voltage and frequency reference according to measurements of reactive and active power at output of the first power source; and
for the selected second power source in P/Q control mode, the wind turbine controller is further adapted for calculating its active and reactive power reference according to measurements of the frequency and voltage at output of the second power.

14. A wind farm, including:
a wind farm controller;
a cable;
a multiple of wind turbines according to claim 8, each of which further includes a third switch arranged between the power output of its converter and the cable and a fourth measurement device for measuring the voltage and frequency on the cable;
wherein:
following islanding mode of the wind farm, the wind farm controller is adapted for:
choosing one wind farm turbine among the plurality of wind turbines;
instructing the wind turbine controller of the chosen wind turbine to control to close the third switch of the chosen wind turbine; and
instructing the wind turbine controller of the other wind turbine to regulate the voltage and frequency of its first power source to approach measurements of the voltage and frequency on the cable by its fourth measurement device, the wind turbine controller of the other wind turbine is further adapted for controlling to close the third switch of the other wind turbine following the regulation by the wind turbine controller of the chosen wind turbine.

15. A wind farm, including:

a wind farm controller;

a cable;

a multiple of wind turbines according to claim 8, each of which further includes a third switch arranged between the power output of its converter and the cable; and a fifth measurement device for measuring the voltage and frequency on the cable;

a substation level energy storage system;

a substation level auxiliary equipment;

a fourth switch, being arranged between the substation level energy storage system and the cable;

a fifth switch, being arranged between the substation level auxiliary equipment and the cable;

wherein:

following islanding mode of the wind farm, the wind farm controller is adapted for:

choosing one wind turbine among the plurality of wind turbines;

instructing the wind turbine controller of the chosen wind turbine to close the third switch of the chosen wind turbine; and instructing to regulate voltage and frequency of the substation level energy storage system operation in V/f control mode to approach the measurements of the voltage and frequency on the cable; and controlling to close the fourth switch and the fifth switch.

16. A wind farm, including:

a wind farm controller;

a cable;

a sixth switch, being arranged between the cable and main grid;

a multiple of wind turbines according to claim 8, each of which further includes a third switch arranged between the power output of its converter and the cable and a fourth measurement device for measuring the voltage and frequency on the cable;

wherein:

during restoration mode of the wind farm following its islanding mode, the wind farm controller is adapted for:

choosing at least one wind turbine among the plurality of wind turbines;

controlling to close the sixth switch;

instructing the wind turbine controller of the chosen wind turbine to regulate the voltage and frequency of its first power source to approach measurements of the voltage and frequency on the cable by its fourth measurement device; and controlling to close the third switch of the chosen wind turbine following the regulation by the wind turbine controller of the chosen wind turbine.

* * * * *